(12) United States Patent
Wan et al.

(10) Patent No.: US 9,734,705 B2
(45) Date of Patent: Aug. 15, 2017

(54) LOGO ASSEMBLY OF AN ELECTRONIC DEVICE

(71) Applicant: Xiaomi Inc., Beijing (CN)

(72) Inventors: Jun Wan, Beijing (CN); Qiang Xu, Beijing (CN); Yongjian Sun, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 467 days.

(21) Appl. No.: 14/281,919

(22) Filed: May 20, 2014

(65) Prior Publication Data

US 2014/0347172 A1 Nov. 27, 2014

Related U.S. Application Data

(63) Continuation of application No. PCT/CN2014/072293, filed on Feb. 20, 2014.

(30) Foreign Application Priority Data

May 21, 2013 (CN) .......................... 2013 1 0189121

(51) Int. Cl.
| | |
|---|---|
| *G05B 11/01* | (2006.01) |
| *G08C 19/00* | (2006.01) |
| *G08C 17/00* | (2006.01) |
| *G06F 3/0488* | (2013.01) |
| *G06F 3/0354* | (2013.01) |

(52) U.S. Cl.
CPC ......... *G08C 19/00* (2013.01); *G06F 3/03547* (2013.01); *G06F 3/0488* (2013.01); *G08C 17/00* (2013.01); *G08C 2201/30* (2013.01)

(58) Field of Classification Search
CPC ...... G08C 19/28; H04N 5/4403; G06F 3/0488
USPC ........................................................ 340/12.22
See application file for complete search history.

(56) References Cited

U.S. PATENT DOCUMENTS

| | | | |
|---|---|---|---|
| 5,528,316 A | * | 6/1996 | Lee ........................... H04N 5/60 348/725 |
| 2006/0087597 A1 | * | 4/2006 | Testin ...................... H04N 5/44 348/836 |

(Continued)

FOREIGN PATENT DOCUMENTS

| | | |
|---|---|---|
| CN | 1446431 A | 10/2003 |
| CN | 2798441 Y | 7/2006 |

(Continued)

*Primary Examiner* — Vernal Brown
(74) *Attorney, Agent, or Firm* — Jun He Law Offices P.C.; James J. Zhu

(57) ABSTRACT

A logo assembly, a control method, a controller and an electronic device are provided. The logo assembly comprises: a front case of a logo and a touchpad attached to a backside of the front case of the logo. The touchpad comprises a touch sensor configured to send a control signal to the controller when detecting a touch control operation to the front case of the logo, such that the controller performs a control operation to the electronic device after receiving the control signal. By attaching the touchpad to the backside of the front case of the logo, it solves the issue that a logo has a negative impact on the design of the position of buttons at the front panel of the electronic device, thus reducing the impact of the logo on the position of the buttons.

18 Claims, 5 Drawing Sheets

(56) References Cited

U.S. PATENT DOCUMENTS

| | | | |
|---|---|---|---|
| 2006/0101684 A1* | 5/2006 | Takahashi | G02B 6/0013 40/541 |
| 2010/0053063 A1 | 3/2010 | Ishii | |
| 2011/0187698 A1* | 8/2011 | Jung | H04N 5/44543 345/212 |
| 2012/0050975 A1 | 3/2012 | Garelli et al. | |
| 2012/0075191 A1* | 3/2012 | Yang | G06F 3/0428 345/168 |

FOREIGN PATENT DOCUMENTS

| | | |
|---|---|---|
| CN | 101790712 A | 7/2010 |
| CN | 102778929 A | 11/2012 |
| CN | 103279221 A | 9/2013 |
| GB | 2489478 A | 3/2012 |
| JP | 2011-139392 A | 7/2011 |
| WO | 2014187178 A1 | 11/2014 |

\* cited by examiner

LOGO ASSEMBLY OF AN ELECTRONIC DEVICE

CROSS-REFERENCE TO RELATED APPLICATIONS

This application is a Continuation of International Application No. PCT/CN2014/072293, filed Feb. 20, 2014, which claims priority to Chinese Patent Application No. 201310189121.0, filed May 21, 2013, the entire contents of all of which are incorporated herein by reference.

TECHNICAL FIELD

The present disclosure generally relates to the electronic field, and more particularly, to a logo assembly, a control method, a controller and an electronic device.

BACKGROUND

To improve user acceptance and to spread notoriety of brand products, many manufacturers, especially electronic device manufacturers, usually add brand logos (LOGO) on their respective products.

The brand logos in current electronic devices are generally arranged at the bottom or top portions of the front panels of the electronic devices. Specifically, take a certain brand of television for example, referring to FIG. 1, which illustrates a front panel of a television. A brand logo of the television is positioned at a center of the bottom portion of the front panel of the television, and buttons such as menu buttons, volume buttons, channel buttons and screen switches and the like are positioned at the right of the bottom portion. The brand logos may be metal or plastic material, or may be silkscreen printing or backside lighting characters.

With an increasing user demand on the appearance of the design of electronic devices, the area for display screen on an electronic device has become increasingly larger at the front panel, and correspondingly the area for buttons at the front panel has become increasingly smaller.

SUMMARY

The embodiments of the present disclosure provide a logo assembly, a control method, a controller and an electronic device.

According to a first aspect of the embodiments of the present disclosure, a logo assembly used in an electronic device is provided. The logo assembly comprises a front case of a logo; and a touchpad attached to a backside of the front case of the logo; wherein the touchpad is connected with a controller of the electronic device; and the touchpad comprises a touch sensor configured to send a control signal to the controller when a touch control operation to the front case of the logo is detected, such that the controller performs a control operation to the electronic device after receiving the control signal.

According to a second aspect of the embodiments of the present disclosure, a control method used in the electronic device is provided. The control method used in an electronic device with a logo assembly comprises receiving a control signal sent by the logo assembly, when a touch control operation to a front case of a logo is detected by the logo assembly; and performing a control operation to the electronic device.

According to a third aspect of the embodiments of the present disclosure, a controller used in the electronic device is provided. The controller comprises a control signal receiving module configured to receive a control signal sent by a logo assembly of the electronic device, when a touch control operation to a front case of a logo is detected by the logo assembly; and a control module configured to perform a control operation to the electronic device.

According to a fourth aspect of the embodiments of the present disclosure, an electronic device is provided. The electronic device may include the logo assembly according to the first aspect or according to any one of the various embodiments thereof, and the controller according to the third aspect or according to any one of the various embodiments thereof.

The solutions according to embodiments of the disclosure may, in part, have the following advantages.

By attachment of a touchpad to a backside of a front case of the logo assembly, when a touch operation to the front case of the logo is detected, a control signal is sent to the controller of the electronic device, such that the controller controls the electronic device according to the control signal. With combination of a control button and the logo assembly of the electronic device, it is solved that a logo has a negative effect on position design of buttons at the front panel of the electronic device, thereby reducing the effect of the logo to the button position.

It should be understood that both the above general description and the following detailed description are only illustrative and explanatory, which do not limit the present disclosure.

BRIEF DESCRIPTION OF THE DRAWINGS

To clearly describe the technical solutions according to the embodiments of the present disclosure, the accompanying drawings used in the embodiments will be briefly described below. Obviously, the accompanying drawings serve the purpose of an example, and for those skilled in the art, other drawings may be obtained without creative labor.

DESCRIPTION OF THE EMBODIMENTS

Detailed description of the present disclosure will be further given with reference to the accompanying drawings in order to make the above objective, technical solutions and advantages of the present disclosure more apparent.

Figure 2:
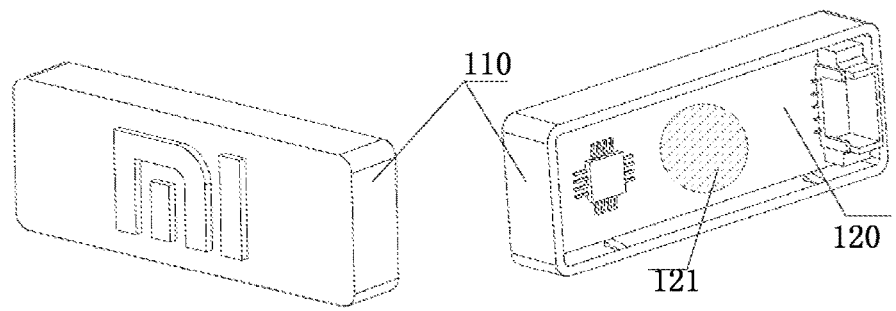
FIG. 2 is an arrangement structural diagram of a logo assembly according to an embodiment of the present disclosure.

Referring to FIG. 2, which illustrates an arrangement structural diagram of a logo assembly according to an embodiment of the present disclosure. The logo assembly may be implemented as a LOGO situated on a case of the electronic device. The electronic device may be a television, a smart mobile phone, a tablet computer and the like. The logo assembly may include: a front case 110 of the logo and a touchpad 120 attached to a backside of the front case 110 of the logo. The touchpad 120 is connected with a controller of the electronic device; and the touchpad comprises a touch sensor 121 configured to send a control signal to the controller when detecting a touch control operation to the front case 110 of the logo, such that the controller performs a control operation to the electronic device after receiving the control signal.

In the embodiment of the present disclosure, by attaching the touchpad to the backside of the front case of the logo, the control signal is sent to the controller of the electronic device when the touch operation to the front case of the logo is detected, such that the controller controls the electronic device according to the control signal. With a combination of a control button and the logo assembly, it solves the issue that a logo has a negative impact on the design of the position of buttons at the front panel of the electronic device, thus, achieving the objective of reducing the impact of the logo on the position of the buttons.

Figure 3:
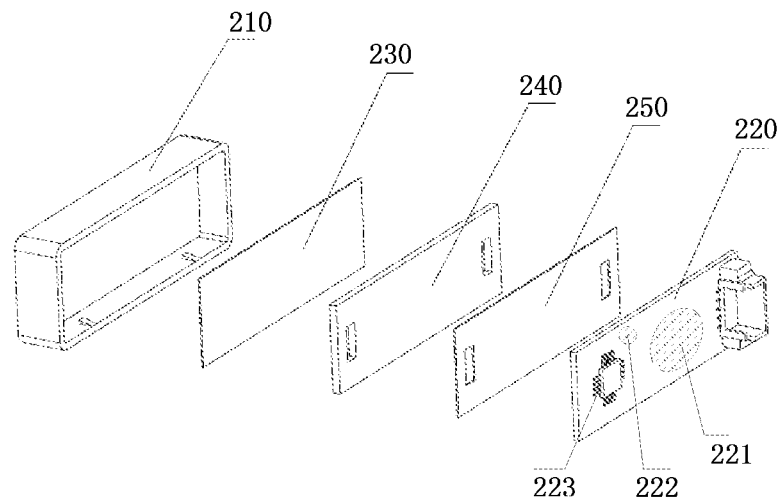
FIG. 3 is an arrangement structural diagram of a logo assembly according to an embodiment of the present disclosure.

Referring to FIG. 3, which illustrates an arrangement structural diagram of a logo assembly according to one embodiment. The logo assembly may be implemented as a LOGO situated on a case of the electronic device. The electronic device may be a television, a smart mobile phone, a tablet computer and the like. The logo assembly may include: a front case 210 of the logo and a touchpad 220 attached to a backside of the front case 210 of the logo.

The touchpad 220 is connected with a controller of the electronic device.

In this case, the controller may be a processor of the electronic device.

The touchpad 220 comprises a touch sensor 221 configured to send a control signal to the controller when detecting a touch control operation to the front case 210 of the logo, such that the controller performs a control operation to the electronic device after receiving the control signal.

The touch sensor 221 may be a capacitive sensor.

In this case, the electronic device comprises at least a standby state and an open state, and the control signal is a logic level signal.

The touch sensor 221 is configured to send the logic level signal to the controller when the electronic device is in the standby state and a touch control operation to the front case 210 of the logo is detected, such that the controller controls the electronic device to start after receiving the logic level signal; the touch sensor is further configured to send the logic level signal to the controller when the electronic device is in the open state and a touch control operation to the front case of the logo is detected, such that the controller controls the electronic device to be switched off after receiving the logic level signal.

The touchpad 220 may further include: a light-emitting diode 222 and a driver circuit 223.

The driver circuit 223 is configured to drive the light-emitting diode 222 to light up under a control operation of the controller when the electronic device is in the standby state; the driver circuit is further configured to drive the light-emitting diode 222 to flicker under a control operation of the controller in a startup procedure of the electronic device; and the driver circuit is further configured to drive the light-emitting diode 222 to be switched off when the electronic device is in the open state.

In addition, the logo assembly may further include: a scattering sheet 230, a light guide plate 240 and a reflecting sheet 250 attached in sequence between the front case 210 of the logo and the touchpad 220 configured to induce uniform lights.

In the embodiment of the present disclosure, by attaching the touchpad to the backside of the front case of the logo, the control signal is sent to the controller of the electronic device when the touch operation to the front case of the logo is detected, such that the controller controls the electronic device according to the control signal. With a combination of a control button and the logo assembly, it solves the issue that a logo has a negative impact on the design of the position of buttons at the front panel of the electronic device, thus, achieving the objective of reducing the impact of the logo on the position of the buttons.

Figure 4:
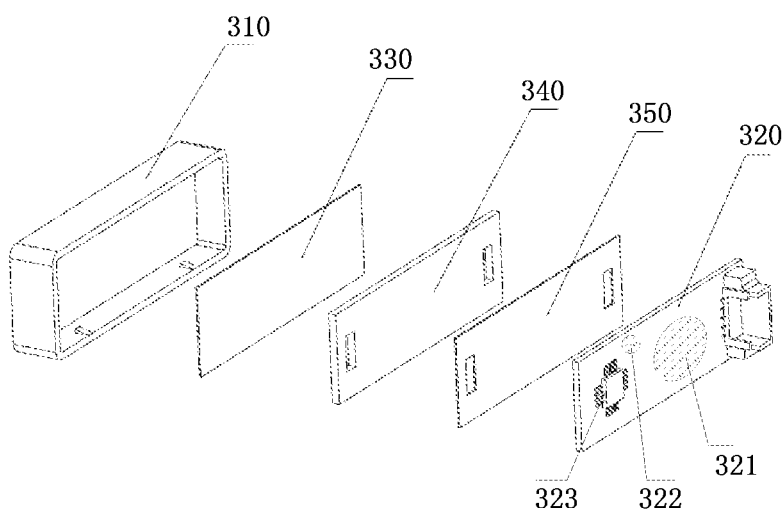
FIG. 4 is an arrangement structural diagram of a logo assembly according to an embodiment of the present disclosure.

Referring to FIG. 4, which illustrates an arrangement structural diagram of a logo assembly according to another embodiment. The logo assembly may be implemented as a LOGO situated on a case of the electronic device. The electronic device may be a television, a smart mobile phone, a tablet computer and the like. The logo assembly may include: a front case 310 of the logo and a touchpad 320 attached to a backside of the front case 310 of the logo.

The touchpad 320 is connected with a controller of the electronic device.

In this case, the controller may be a processor of the electronic device.

The touchpad 320 may include a touch sensor 321 configured to send a control signal to the controller when detecting a touch control operation to the front case 310 of the logo, such that the controller performs a control operation to the electronic device after receiving the control signal.

In this case, the electronic device comprises at least a standby state and an open state, and the control signal is a logic level signal.

The touch sensor 321 is configured to send the logic level signal to the controller when the electronic device is in the standby state and a touch control operation to the front case 310 of the logo is detected, such that the controller controls the electronic device to start after receiving the logic level signal; the touch sensor is further configured to send the logic level signal to the controller when the electronic device is in the open state and a touch control operation to the front case of the logo is detected, such that the controller controls the electronic device to be switched off after receiving the logic level signal.

The touch sensor 321 may be a capacitive sensor (it is actually constructed as a mini metal plate), which may sense changes of capacitance, and convert the change of the capacitance into logic level signals to be sent to the controller.

In one exemplary embodiment, when the user's finger approaches or touches the front case 310 of the logo, it may cause changes in the polar interval of the capacitive sensor and the dielectric constant of the medium, resulting in a change of the capacitance value of the capacitive sensor. A processing chip in the capacitive sensor determines whether a finger touches the front case 310 of the logo by measuring charge value of the capacitive sensor and the change in the voltage on the capacitive sensor, thus realizing the detection procedures of the touch operation.

The touchpad 320 may further include: a light-emitting diode 322 and a driver circuit 323.

The driver circuit 323 is configured to drive the light-emitting diode 322 to light up under a control operation of the controller when the electronic device is in the standby state; the driver circuit is further configured to drive the light-emitting diode 322 to flicker under a control operation of the controller in a startup procedure of the electronic device; and the driver circuit is further configured to drive the light-emitting diode 322 to be switched off when the electronic device is in the open state.

Figure 5:
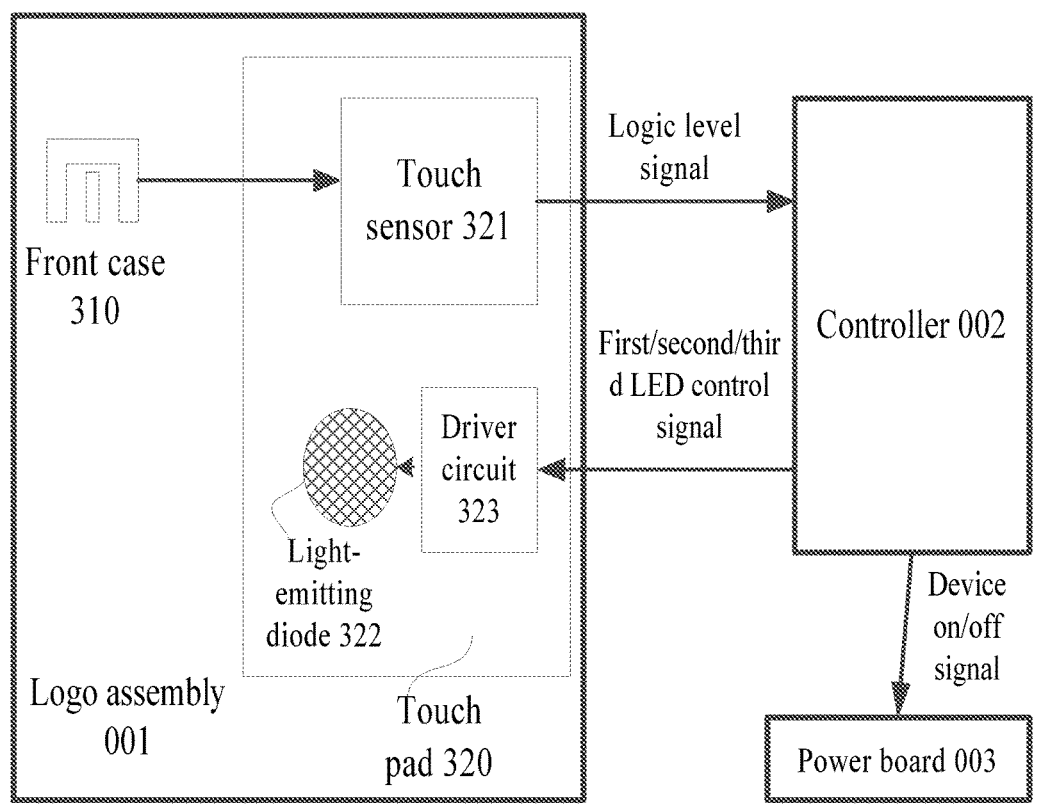
FIG. 5 is a connection diagram of a logo assembly and a controller according to an embodiment of the present disclosure.

Referring to FIG. 5, which illustrates a connection diagram of a logo assembly 001 and a controller 002 provided by the embodiment of the present disclosure.

The initial state of the electronic device is a standby state. The controller 002 sends a control signal of a first light-emitting diode (LED) to the driver circuit 323, such that the driver circuit 323 drives the light-emitting diodes 322 to light up.

When a user turns on the electronic device, the touch sensor 321, when detecting that the user's finger touches the front case of the logo 310, may send the logic level signal to the controller 002. After the controller 002 receives the logic level signal, it may detect that the electronic device is being in the standby state, the controller 002 then sends a device start signal to a power board 003 of the electronic device, such that the power board 003 switches on the electric source of the display screen.

After sending a device start signal, the controller 002 may also determine whether the startup of the electronic device is finished within a predetermined time interval. If the startup of the electronic device is not finished, the controller 002 sends a second LED control signal to the driver circuit 323, such that the driver circuit 323 drives the light-emitting diodes 322 to flicker to prompt the user that the electronic device is being turned on. And if the startup of the electronic device is finished, then the controller 002 sends a third LED control signal to the driver circuit 323, such that the driver circuit 323 drives the light-emitting diodes 322 to be switched off.

After the startup of the electronic device is finished, when the user turns off the electronic device to put the electronic device in the standby state, the touch sensor 321 may detect that the user's finger touches the front case of the logo 310, then send a logic level signal to the controller 002. After the controller 002 receives the logic level signal, it may detect that the electronic device is being in the open state, it then sends a device close signal to the power board 003 of the electronic device, such that the power board 003 turns off power supply of the display screen.

In addition, the logo assembly may further comprise: a scattering sheet 330, a light guide plate 340 and a reflecting sheet 350 attached in sequence between the front case 310 of the logo and the touchpad 320 configured to induce uniform lights.

In the embodiment of the present disclosure, by attaching the touchpad to the backside of the front case of the logo, the control signal is sent to the controller of the electronic device when the touch operation to the front case of the logo is detected, such that the controller controls the electronic device according to the control signal. With a combination of a control button and the logo assembly, it solves the issue that a logo has a negative impact on the design of the position of buttons at the front panel of the electronic device, thus, achieving the objective of reducing the impact of the logo on the position of the buttons.

Figure 1:
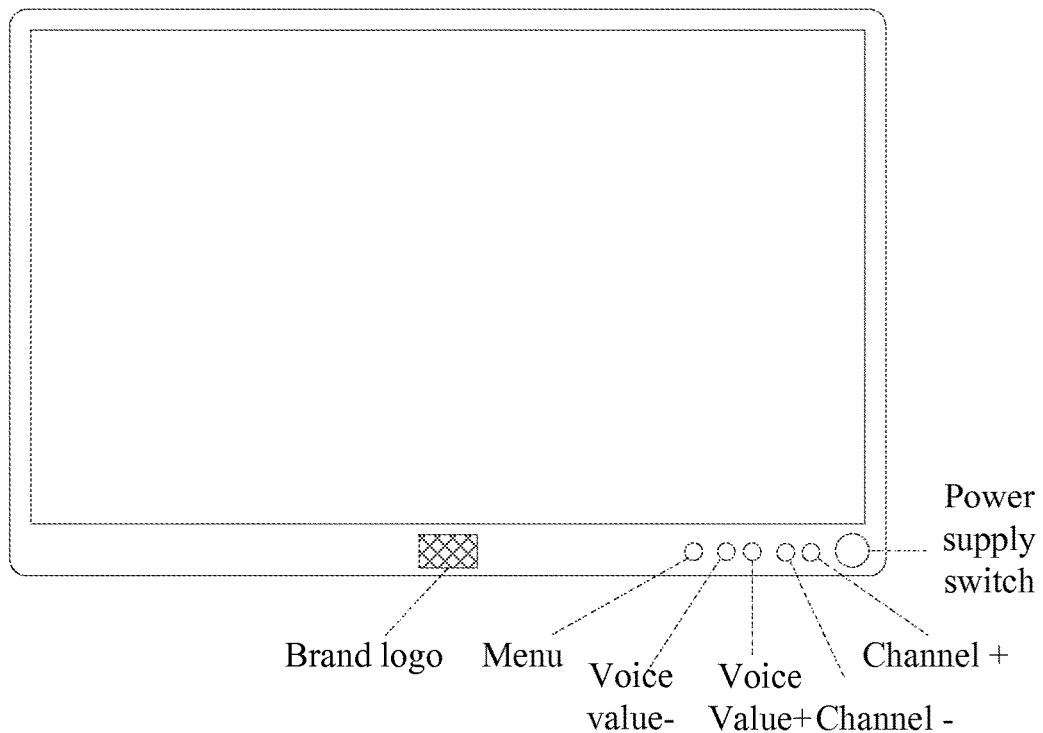
FIG. 1 is a diagram of a front panel of a television according to the background of present disclosure.
Figure 6:
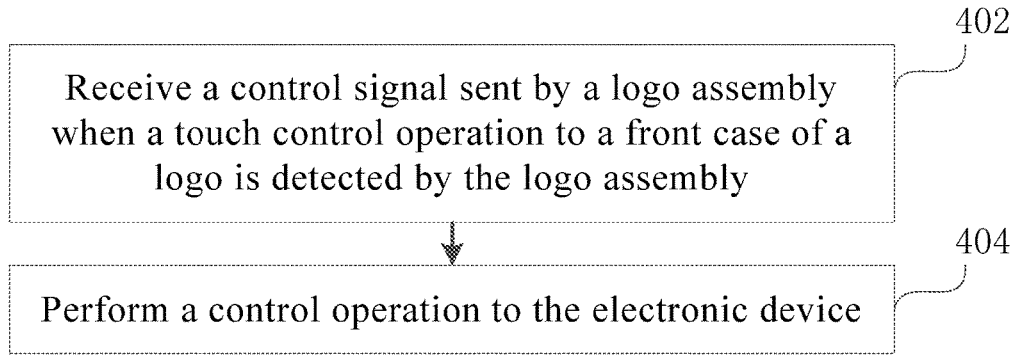
FIG. 6 is a flow chart showing a control method according to an embodiment of the present disclosure.

Referring to FIG. 6, which illustrates a flow chart showing a control method provided by an embodiment of the present disclosure. The control method is used in a controller of the electronic device as shown in FIG. 1. The control method comprises the following steps.

In Step 402, the control method includes receiving a control signal sent by a logo assembly when a touch control operation to a front case of a logo is detected by the logo assembly.

In Step 404, the control method includes performing a control operation to the electronic device.

In the embodiment of the present disclosure, according to the control method, a control operation is performed to the electronic device after receiving the control signal sent to the front case of the logo when the logo assembly detects the touch operation. With a combination of a control button and the logo assembly, it solves the issue that a logo has a negative impact on the design of the position of buttons at the front panel of the electronic device, thus, achieving the objective of reducing the impact of the logo on the position of the buttons.

Figure 7:
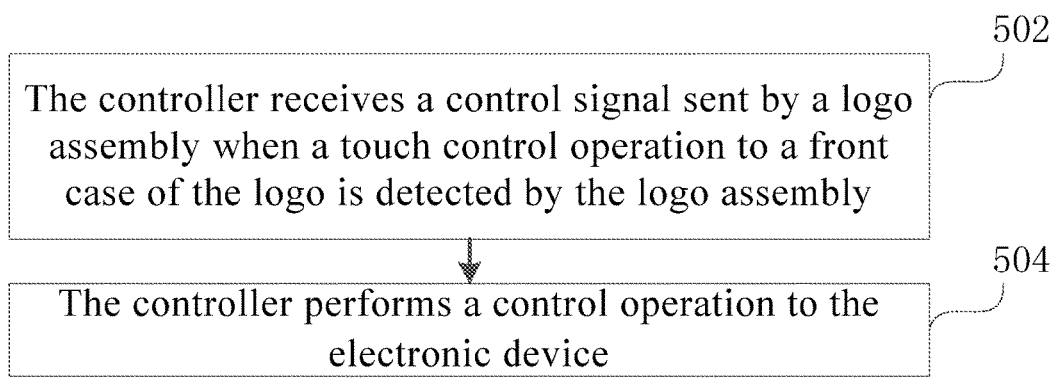
FIG. 7 is a flow chart showing a control method according to an embodiment of the present disclosure.

Referring to FIG. 7, which illustrates a flow chart showing a control method provided by an embodiment of the present disclosure, which is performed by a controller of an electronic device including the logo assembly as shown in FIG. 3 or FIG. 4. The control method comprises the following steps.

In Step 502, the controller may receives a control signal sent by a logo assembly when the logo assembly detects a touch control operation to a front case of a logo.

In this case the control signal is a logic level signal, the logo assembly includes a touchpad attached to the front case of the logo thereof, and the touchpad includes a touch sensor therein. The controller may receive the logic level signal sent by the touch sensor when the touch control operation to the front case of the logo is detected.

In Step 504, the controller performs a control to the electronic device.

The electronic device comprises at least two a standby state and an open state. The controller, when receiving the logic level signal sent by the touch sensor, may control the electronic device according to the current state of the electronic device.

When the electronic device is in the standby state, the electronic device is controlled to start. Moreover, when the electronic device is in the open state, the electronic device is controlled to be switched off.

In addition, the touchpad may also include a light-emitting diode and a driver circuit that drives the light-emitting diodes to light up or be switched off.

When the electronic device is in the standby state and the controller controls the electronic device to start, the controller may also determine if the startup of the electronic device is finished. If determining the startup of the electronic device is not finished, then the controller controls the driver circuit drive the light-emitting diodes to flicker; and if determining the startup of the electronic device is finished, then the controller controls the driver circuit to drive the light-emitting diodes to be switched off.

When the electronic device is in the open state and the controller controls the electronic device to be switched off, the electronic device enters into the standby state. During this time, the control device controls the driver circuit to drive the light-emitting diodes to light up.

In one embodiment, take a television for example as the electronic device, when the television is in the standby state, the light-emitting diodes is in the lighten state. During this time, if the touch sensor detects the user's touch operation to the front case of the logo, a logic level signal is sent to the controller. After the controller receives the logic level signal, it may detect that the television is being in the standby state, the user's intention is determined as to open the television, then it sends a start signal to the power board of the television so as to control the power board to provide electric power to the television, then the television enters a start course.

After the controller sends a start signal, a determination is performed once every predetermined time interval to determine if the startup of the television is finished. If determining that the startup of the television is not finished, the controller controls the driver circuit to drive the light-emitting diodes to flicker, so as to prompt the user that the television is being turned on; and if determining that the startup of the television is finished, the controller controls the driver circuit to drive the light-emitting diodes to be switched off.

After the startup of the television is finished, if the touch sensor detects the user's touch to the front case of the logo, then it sends a logic level signal to the controller. After the controller receives the logic level signal, it may detect that the television is being in the open state, the user's intention is determined as to turn off the television, then it sends an off signal to the power board of the television so as to control the power board to switch off the power supply to the television.

After the controller sends an off signal, it then controls the driver circuit to drive the light-emitting diodes to light up again.

In the embodiment of the present disclosure, according to the control method, a control operation is performed to the electronic device after receiving the control signal sent to the front case of the logo when the logo assembly detects the touch operation. With a combination of a control button and the logo assembly, it solves the issue that a logo has a negative impact on the design of the position of buttons at the front panel of the electronic device, thus, achieving the objective of reducing the impact of the logo on the position of the buttons.

Figure 8:
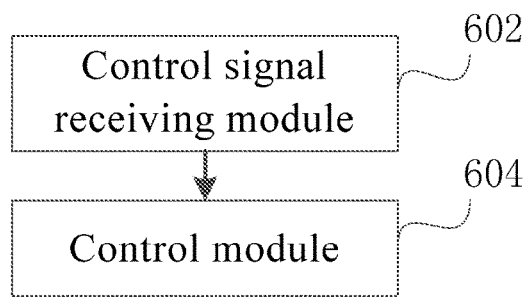
FIG. 8 is a block diagram of a controller according to an embodiment of the present disclosure.

Referring to FIG. 8, which illustrates a block diagram of a controller provided by an embodiment of the present disclosure. The controller may be used in an electronic device including the logo assembly as shown in FIG. 2, and is configured to control the electronic device. The controller may include a control signal receiving module 602 configured to receive a control signal sent by the logo assembly when a touch control operation to a front case of a logo is detected by the logo assembly.

Moreover, the controller may further include a control module 604 configured to control the electronic device.

In the embodiment of the present disclosure, according to the controller, a control operation is performed to the electronic device after receiving the control signal sent to the front case of the logo when the logo assembly detects the touch operation. With a combination of a control button and the logo assembly, it solves the issue that a logo has a negative impact on the design of the position of buttons at the front panel of the electronic device, thus, achieving the objective of reducing the impact of the logo on the position of the buttons.

Figure 9:
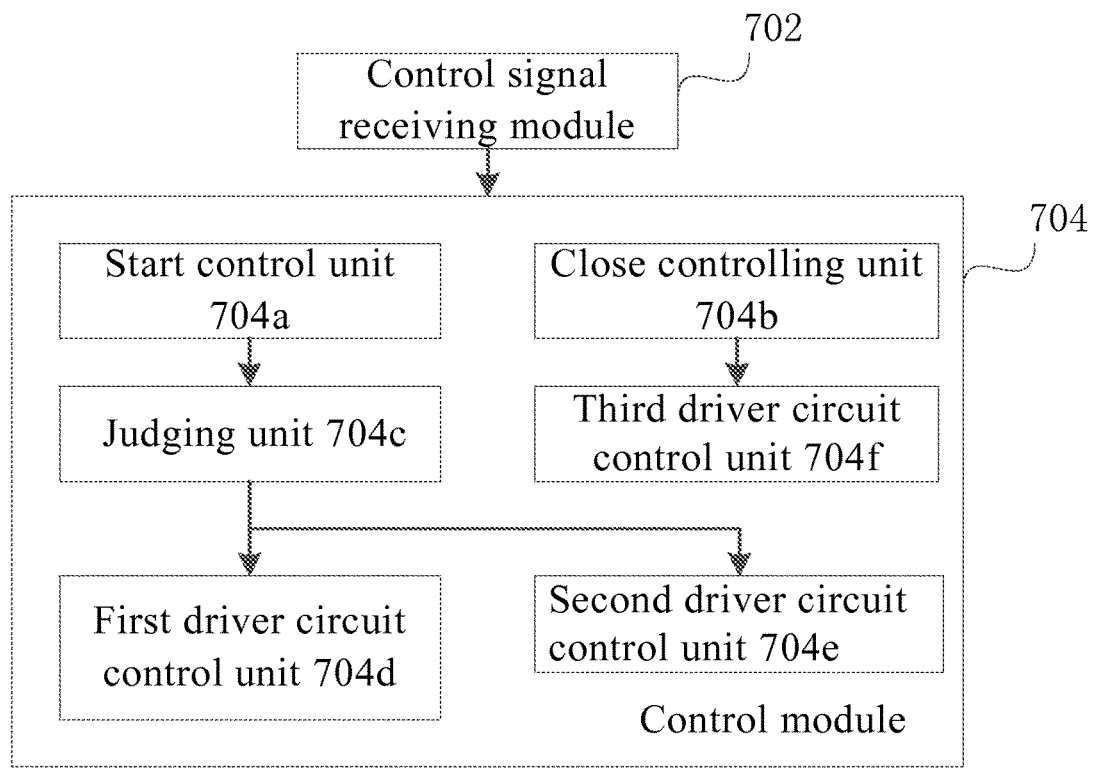
FIG. 9 is a block diagram of a controller according to an embodiment of the present disclosure.

Referring to FIG. 9, which illustrates a block diagram of a controller provided by an embodiment of the present disclosure. The controller may be used in an electronic device including the logo assembly as shown in FIG. 3 or FIG. 4, and is configured to control the electronic device.

The controller may include: a control signal receiving module 702 configured to receive a control signal sent by the logo assembly when a touch control operation to a front case of a logo is detected by the logo assembly.

Moreover, the controller may further include a control module 704 configured to perform a control operation to the electronic device.

In this case, the electronic device comprises at least a standby state and an open state, and the control signal is a logic level signal; wherein the control signal receiving module is configured to receive the logic level signal sent by the logo assembly when a touch sensor in the logo assembly detects the touch control operation to the front case of the logo.

The control module 704 may include: a start control unit 704a configured to control the electronic device to start when the electronic device is in the standby state and a close control unit 704b configured to control the electronic device to be switched off when the electronic device is in the open state.

The control module may further include a determining unit 704c configured to determine if the startup of the electronic device is finished after the start control unit controls the electronic device to start, a first driver circuit control unit 704d configured to control the driver circuit to drive the light-emitting diode to flicker if the determining unit determines that the startup of the electronic device is not finished and a second driver circuit control unit 704e configured to control the driver circuit to drive the light-emitting diode to be switched off if the determining unit determines that the startup of the electronic device is finished.

The control module may further include a third driver circuit control unit 704f configured to control the driver circuit to drive the light-emitting diode to light up after the close control unit controls the electronic device to be switched off.

In the embodiment of the present disclosure, according to the controller, a control operation is performed to the electronic device after receiving the control signal sent to the front case of the logo when the logo assembly detects the touch operation. With a combination of a control button and the logo assembly, it solves the issue that a logo has a negative impact on the design of the position of buttons at the front panel of the electronic device, thus, achieving the objective of reducing the impact of the logo on the position of the buttons.

Figure 10:
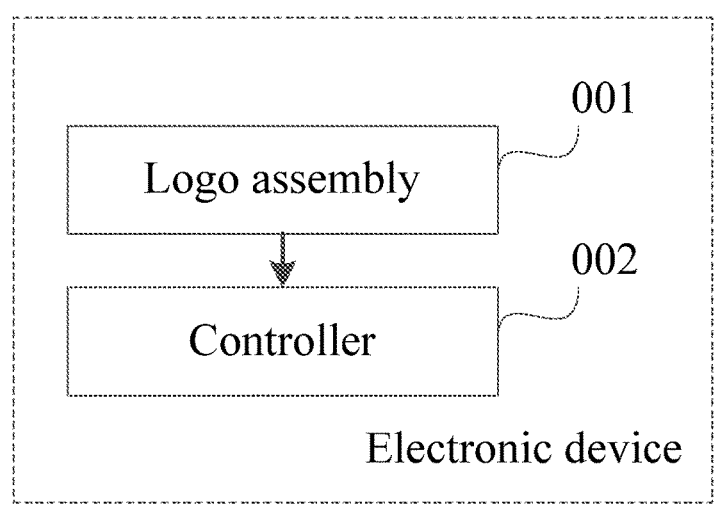
FIG. 10 is a configuration diagram of an electronic device according to an embodiment of the present disclosure.

Referring to FIG. 10, which illustrates a configuration diagram of an electronic device according to an embodiment of the present invention. The electronic device may include a logo assembly 004 and a controller 005. The logo assembly 004 may be an assembly as shown in FIG. 3 or FIG. 4, and the controller 005 may be a controller as shown in FIG. 8 or FIG. 9.

In conclusion, by attachment of a touchpad to a backside of a front case of the logo assembly, when a touch operation to the front case of the logo is detected, a control signal is sent to the controller of the electronic device, such that the controller controls the electronic device according to the control signal. With combination of a control button and the logo assembly of the electronic device, it is solved that a logo has a negative effect on position design of buttons at the front panel of the electronic device, achieving an object of reducing the effect of the logo to the button position.

It should be explained that, for the control operation performed by the controller to the electronic device mentioned in the above embodiment, the above divided respective function modules are described merely as an example.

In actual applications, the above allocated functions may be implemented with different function modules according to actual needs, that is, the inner structure of the controller may be divided into different function modules to accomplish part or all of the functions described above. In addition, with respect to the controller provided by the above embodiment, the specific implementations have been described in details in the methods, and will not elaborated herein.

The sequence number of the above embodiments of the present disclosure is illustrated for description purpose only, which does not indicate any superiority or inferiority of the embodiments.

It should be understood by those skilled in the art that part or all of the steps in the embodiments may be implemented by hardware or programs which instruct the related hardware. The programs may be stored in a computer readable storage medium. The storage medium may be a read-only memory, a magnetic disc, an optical disc or the like.

The embodiments described above are merely the preferred embodiments of the present disclosure, and are not intended to limit the present disclosure. All modifications, equivalents improvements made within the concept and principles of the present disclosure shall fall within the protection scope of the present disclosure.

What is claimed is:

1. A logo assembly of an electronic device, the logo assembly being positioned on a case of the electronic device and comprising:
   a front case of a logo; and
   a touchpad attached to a backside of the front case of the logo, wherein the touchpad is connected with a controller of the electronic device; and the touchpad comprises:
      a touch sensor configured to send a control signal to the controller when a touch control operation to the front case of the logo is detected, such that the controller performs a control operation to the electronic device after receiving the control signal;
      a light-emitting diode;
      a driver circuit configured to: drive the light-emitting diode to light up under a control operation of the controller when the electronic device is in the standby state; drive the light-emitting diode to flicker under a control operation of the controller in a startup procedure of the electronic device; drive the light-emitting diode to be switched off when the electronic device is in the open state;
      a scattering sheet;
      a light guide plate; and
      a reflecting sheet, wherein the scattering sheet, the light guide plate and the reflecting sheet are attached in sequence between the front case of the logo and the touchpad to induce uniform lights.

2. The logo assembly according to claim 1, wherein the electronic device comprises at least a standby state and an open state, and the control signal is a logic level signal.

3. The logo assembly according to claim 2, wherein the touch sensor is configured to send the logic level signal to the controller when the electronic device is in the standby state and a touch control operation to the front case of the logo is detected, such that the controller controls the electronic device to start after receiving the logic level signal.

4. The logo assembly according to claim 2, wherein the touch sensor is further configured to send the logic level signal to the controller when the electronic device is in the open state and a touch control operation to the front case of the logo is detected, such that the controller controls the electronic device to be switched off after receiving the logic level signal.

5. A control method used in an electronic device with a logo assembly, the logo assembly positioned on a case of the electronic device, the method comprising:
   receiving a control signal sent by the logo assembly, when a touch control operation to a front case of a logo is detected by the logo assembly; and
   performing a control operation to the electronic device;
   wherein the logo assembly comprises:
   a front case of a logo; and
   a touchpad attached to a backside of the front case of the logo, wherein the touchpad is connected with a controller of the electronic device; and the touchpad comprises:
      a touch sensor configured to send a control signal to the controller when a touch control operation to the front case of the logo is detected, such that the controller performs a control operation to the electronic device after receiving the control signal;
      a light-emitting diode;
      a driver circuit configured to: drive the light-emitting diode to light up under a control operation of the controller when the electronic device is in the standby state; drive the light-emitting diode to flicker under a control operation of the controller in a startup procedure of the electronic device; drive the light-emitting diode to be switched off when the electronic device is in the open state;
      a scattering sheet;
      a light guide plate; and
      a reflecting sheet, wherein the scattering sheet, the light guide plate and the reflecting sheet are attached in sequence between the front case of the logo and the touchpad to induce uniform lights.

6. The method according to claim 5, wherein the electronic device comprises at least a standby state and an open state, and the control signal is a logic level signal.

7. The control method according to claim 6, wherein receiving the control signal sent by the logo assembly comprises:
   receiving the logic level signal sent by the logo assembly when the touch control operation to the front case of the logo is detected by the touch sensor in the logo assembly.

8. The control method according to claim 6, wherein performing the control operation to the electronic device comprises:
   controlling the electronic device to start when the electronic device is in the standby state; and
   controlling the electronic device to be switched off when the electronic device is in the open state.

9. The control method according to claim 8, wherein after controlling the electronic device to start, the method further comprises:
   determining if the startup of the electronic device is finished;
   if the startup of the electronic device is not finished, controlling a driver circuit to drive a light-emitting diode to flicker; and
   if the startup of the electronic device is finished, controlling the driver circuit to drive the light-emitting diode to be switched off.

10. The control method according to claim 8, wherein after controlling the electronic device to be switched off, the method further comprises:

performing a control operation to a driver circuit to drive a light-emitting diode to light up.

11. A controller of an electronic device with a logo assembly, the logo assembly positioned on a case of the electronic device, the controller comprising:
- a control signal receiving module configured to receive a control signal sent by a logo assembly of the electronic device, when a touch control operation to a front case of a logo is detected by the logo assembly; and
- a control module configured to perform a control operation to the electronic device;
- wherein the logo assembly comprises:
- a front case of a logo; and
- a touchpad attached to a backside of the front case of the logo, wherein the touchpad is connected with a controller of the electronic device; and the touchpad comprises:
  - a touch sensor configured to send a control signal to the controller when a touch control operation to the front case of the logo is detected, such that the controller performs a control operation to the electronic device after receiving the control signal;
  - a light-emitting diode;
  - a driver circuit configured to: drive the light-emitting diode to light up under a control operation of the controller when the electronic device is in the standby state; drive the light-emitting diode to flicker under a control operation of the controller in a startup procedure of the electronic device; drive the light-emitting diode to be switched off when the electronic device is in the open state;
- a scattering sheet;
- a light guide plate; and
- a reflecting sheet, wherein the scattering sheet, the light guide plate and the reflecting sheet are attached in sequence between the front case of the logo and the touchpad to induce uniform lights.

12. The controller according to claim 11, wherein the electronic device comprises at least a standby state and an open state, and the control signal is a logic level signal.

13. The controller according to claim 12, wherein the control signal receiving module is configured to receive the logic level signal sent by the logo assembly, when the touch control operation to the front case of the logo is detected by the touch sensor in the logo assembly.

14. The controller according to claim 12, wherein the control module comprises:
- a start control unit configured to control the electronic device to start when the electronic device is in the standby state; and
- a close control unit configured to control the electronic device to be switched off when the electronic device is in the open state.

15. The controller according to claim 13, wherein the control module further comprises:
- a determining unit configured to determine if a startup of the electronic device is finished after the start control unit controls the electronic device to start;
- a first driver circuit control unit configured to control a driver circuit to drive a light-emitting diode to flicker if the determining unit determines that the startup of the electronic device is not finished; and
- a second driver circuit control unit configured to control the driver circuit to drive the light-emitting diode to be switched off if the determining unit determines that the startup of the electronic device is finished.

16. The controller according to claim 13, wherein the control module further comprises:
- a third driver circuit control unit configured to control a driver circuit to drive a light-emitting diode to light up after the close control unit controls the electronic device to be switched off.

17. An electronic device, comprising:
- a logo assembly positioned on a case of the electronic device; and
- a controller;
- wherein the logo assembly of the electronic device comprises:
- a front case of a logo; and
- a touchpad attached to a backside of the front case of the logo, wherein the touchpad is connected with a controller of the electronic device; and the touchpad comprises:
  - a touch sensor configured to send a control signal to the controller when a touch control operation to the front case of the logo is detected, such that the controller performs a control operation to the electronic device after receiving the control signal;
  - a light-emitting diode;
  - a driver circuit configured to: drive the light-emitting diode to light up under a control operation of the controller when the electronic device is in the standby state; drive the light-emitting diode to flicker under a control operation of the controller in a startup procedure of the electronic device; drive the light-emitting diode to be switched off when the electronic device is in the open state;
- a scattering sheet;
- a light guide plate; and
- a reflecting sheet, wherein the scattering sheet, the light guide plate and the reflecting sheet are attached in sequence between the front case of the logo and the touchpad to induce uniform lights.

18. The electronic device according to claim 17, wherein the electronic device comprises at least a standby state and an open state, and the control signal is a logic level signal.

* * * * *